(12) United States Patent
Shiraiwa et al.

(10) Patent No.: US 7,316,097 B2
(45) Date of Patent: Jan. 8, 2008

(54) GLASS RUN CHANNEL FOR VEHICLE AND GLASS RUN CHANNEL ASSEMBLY FOR VEHICLE

(75) Inventors: Masaki Shiraiwa, Aichi (JP); Osamu Kanehara, Aichi (JP); Tatsuya Tamura, Aichi (JP); Yuji Tanaka, Aichi (JP); Hideto Hiwa, Aichi (JP)

(73) Assignee: Tokai Kogyo Co., Ltd., Obu (JP)

( * ) Notice: Subject to any disclaimer, the term of this patent is extended or adjusted under 35 U.S.C. 154(b) by 52 days.

(21) Appl. No.: 10/950,407

(22) Filed: Sep. 28, 2004

(65) Prior Publication Data

US 2006/0064936 A1    Mar. 30, 2006

(51) Int. Cl.
*E05D 15/16* (2006.01)

(52) U.S. Cl. .......................................... 49/441

(58) Field of Classification Search .................. 49/440, 49/441, 475.1, 489.1, 495.1
See application file for complete search history.

(56) References Cited

U.S. PATENT DOCUMENTS

| | | | |
|---|---|---|---|
| 3,131,439 A * | 5/1964 | Wilfert | ........................ 49/416 |
| 5,639,522 A | 6/1997 | Maki et al. | |
| 6,644,718 B2 * | 11/2003 | Nozaki | ..................... 296/146.9 |
| 6,708,450 B2 | 3/2004 | Tanaka et al. | |

FOREIGN PATENT DOCUMENTS

| | | | | |
|---|---|---|---|---|
| JP | 61-71247 | * | 4/1986 | |
| JP | U 63-88521 | | 6/1988 | |
| JP | A 2002-187431 | | 7/2002 | |
| JP | 2003-165340 | * | 6/2003 | ................. 49/441 |
| JP | A-2003-175728 | | 6/2003 | |
| JP | 2004-1771 | * | 1/2004 | ................. 49/441 |
| JP | A-2004-224296 | | 8/2004 | |

* cited by examiner

*Primary Examiner*—Jerry Redman
(74) *Attorney, Agent, or Firm*—Oliff & Berridge, PLC

(57) ABSTRACT

A glass run channel mountable along a window frame and made of a thermoplastic elastomer includes a base portion, a pair of side wall portions extending from the base portion, and projections that engage the window frame. A non-slip portion made of material having a larger coefficient of friction with respect to the window frame than that of the thermoplastic elastomer is provided on a face of the base portion opposite to the window frame. The non-slip portion is less slidable on the window frame than the thermoplastic elastomer, and further less slidable due to an orthogonal load produced when the glass run channel is mounted and pressed. Therefore, the glass run channel is stably maintained at a predetermined position in the window frame even if a force is exerted by sliding the window pane repeatedly.

21 Claims, 10 Drawing Sheets

GLASS RUN CHANNEL FOR VEHICLE AND GLASS RUN CHANNEL ASSEMBLY FOR VEHICLE

Japanese Patent Application No. 2002-255153 and 2003-297438 are incorporated herein by reference in its entirety.

BACKGROUND OF THE INVENTION

1. Field of Invention

The present invention relates to a glass run channel for a vehicle, and a glass run channel assembly for a vehicle, which are mounted on a window frame of the vehicle to guide a window pane in a sliding direction and seal a gap between the window pane and the window frame.

2. Description of Related Art

A long glass run channel having an approximately U-character shape in cross section, which is mounted in a groove of the window frame of a vehicle to guide the window pane to be lifted up or down, typically includes a base portion and a pair of side wall portions standing from both ends of the base portion in the width direction. The base portion and the pair of side wall portions form a guide groove having a U-character shape in cross section. Also, the glass run channel includes a contacting lip having a shape extending obliquely from the distal end of each side wall portion to the inside of the guide groove. The glass run channel is elastically deformable as a whole, and typically secured at a predetermined position of the window frame owing to an engagement structure with the window frame and a resilient force of the glass run channel. Though the glass run channel of this kind is conventionally formed of rubber material, it has been proposed to use a thermoplastic elastomer material having a lower specific weight and a better recycling ability is employed as alternative in promoting the lighter weight and recycling of the vehicle (refer to JP-A-2003-175728).

SUMMARY OF THE INVENTION

However, a glass run channel made of the thermoplastic elastomer may dislocate from the predetermined position in a bent portion of the window frame, especially at a corner portion, or a portion adjacent to the corner portion, of the window pane (typically an upper end portion of the window frame), as indicated by the broken line in FIG. 1, when the window pane is opened and closed repeatedly.

The present inventors have investigated the cause of dislocation of a glass run channel, and found that a longitudinal compressive force is present at a corner portion (portion 9 in FIG. 1) located rearwards on the upper part of a vehicle, while a longitudinal compressive force or tensile force is present at a corner portion (portion 8 in FIG. 1) forwards on the upper part of the vehicle. From this result, the present inventors have hypothesized that the glass run channel made of the thermoplastic elastomer may slide minutely along the window frame, when the window pane is opened or closed and slid in the glass run channel, and in a case where a compressive force or tensile force caused by accumulation of this minute amount of slide exceeds a predetermined value, the dislocation from the window frame occurs.

Thus, it is an object of the present invention to provide a glass run channel for a vehicle, and a glass run channel assembly for a vehicle, which are restricted from sliding on the window frame.

In order to accomplish the above object, a first aspect of the present invention provides a glass run channel for a vehicle, mountable along a window frame of the vehicle and made of a thermoplastic elastomer for guiding a slidable window pane when the glass run channel is mounted. The glass run channel includes a base portion that opposes a bottom face of the window frame when the glass run channel is mounted on the window frame; a pair of side wall portions extending from the base portion; at least one elastically deformable contacting lip protruding from a distal end, or from near a distal end, of a respective one of the side wall portions toward the base portion; a plurality of projections that project outwards at least from the ends of the base portion or from the pair of side wall portions, which engage inner faces of the window frame when the glass run channel is mounted; and a non-slip portion made of a resin material having a larger coefficient of friction with respect to the window frame than that of the thermoplastic elastomer of the base portion along a longitudinal direction on the base portion. The base portion may be formed integrally with the non-slip portion, and the non-slip portion is pressed against the bottom face of the window frame due to a force applied by the plurality of projections when the glass run channel is mounted on the window frame.

Preferably the non-slip portion is made of rubber.

Preferably the non-slip portion is made of foam rubber and pressed in an elastically compressed state between the bottom face of the window frame and the base portion.

Preferably the non-slip portion is made of a thermoplastic elastomer.

Preferably the non-slip portion is made of an olefin thermoplastic elastomer having durometer hardness from HDA30 to HDA60 in accordance with JIS K7215.

Preferably the non-slip portion is welded or fused with the base portion.

Preferably the non-slip portion is formed like a flat plate, and a whole face of the non-slip portion contacts with the bottom face of the window frame.

Preferably the thermoplastic elastomer making up the base portion is an olefin thermoplastic elastomer.

Preferably a glass run channel according to the first aspect of the present invention further includes a sliding portion provided in a layer on the back face of the base portion which contacts with a peripheral edge of the window pane, wherein the sliding portion is made of a material having a smaller coefficient of friction with respect to the window pane than that of a constituent material of the base portion.

Preferably a glass run channel according to the first aspect of the present invention further includes a sliding portion provided in a layer on a face of the contacting lip which elastically contacts with the window pane, wherein the sliding portion is made of a material having a smaller coefficient of friction with respect to the window pane than that of a constituent material of the contacting lip.

Preferably a glass run channel according to the first aspect of the present invention further includes a longitudinal projection projecting outwards from the ends of the base portion, wherein a space is formed between the base portion, the bottom face of the window frame and the longitudinal projection when the glass run channel is mounted on the window frame, and the non-slip portion is disposed in a compressed state between the base portion and the bottom face of the window frame within the space while the longitudinal projection directly contacts the window frame.

Preferably a glass run channel according to the first aspect of the present invention further includes a cover lip extending from the side wall portion for covering a gap between the window frame and the glass run channel when the glass run channel is mounted on the window frame, and another non-slip portion provided on a face of at least the cover lip or the projections which face the window frame. The other non-slip portion is made of a material having a larger coefficient of friction than that of the thermoplastic elastomer making up at least the cover lip or the projection, and is pressed against the window frame when the glass run channel is mounted on the window frame.

Also, a second aspect of the present invention provides a glass run channel assembly for a vehicle, mountable along a window frame of the vehicle and made of a thermoplastic elastomer for guiding a slidable window pane when the glass run channel assembly is mounted. The assembly includes a plurality of linear extruded members; and at least one injection molded corner member having a shape in which terminals of the extruded members in a longitudinal direction are intersected at a certain angle and joined. The extruded members and the injection molded corner member include a base portion that faces a bottom face of the window frame when the glass run channel assembly is mounted on the window frame, a pair of side wall portions extending from the base portion, at least one elastically deformable contacting lip protruding from a distal end, or from near a distal end, of a respective one of the side wall portions toward the base portion, and a plurality of projections, projecting outwards in the width direction at least from the ends of the base portion or from the respective side wall portions, which engage inner faces of the window frame when the glass run channel assembly is mounted. At least one base portion of the extruded members has a non-slip portion made of a resin material having a larger coefficient of friction with respect to the window frame than that of the thermoplastic elastomer of the base portion along a longitudinal direction on the base portion, and the non-slip portion is pressed against the bottom face of the window frame due to a force applied by the plurality of projections when the glass run channel is mounted on the window frame.

Preferably the extruded member mounted in a portion of the window frame against which the distal end of the window pane abuts by sliding the window pane is a glass run channel assembly according to the first aspect of the present invention.

The present invention provides a glass run channel for a vehicle and a glass run channel assembly for a vehicle which are suppressed from sliding on the window frame, whereby dislocation of the glass run channel and the glass run channel assembly with respect to the window frame in the longitudinal direction does not occur even if the window pane is slid repeatedly.

Particularly, when the glass run channel for vehicle according to the first aspect of the present invention is mounted on the window frame, the non-slip portion is pressed between the bottom face of the window frame and the base portion. The non-slip portion is made of a material having a larger coefficient of friction than that of the thermoplastic elastomer of the base portion, and the frictional force with the bottom face of the window frame is increased owing to a vertical load produced because the non-slip portion is pressed. Therefore, the non-slip portion is less likely to slide with respect to the window frame due to a force in a direction (longitudinal direction) along the window frame. Accordingly, the glass run channel for vehicle is not dislocated by a load caused by sliding the window pane, and is kept at the predetermined mounted position in the window frame stably.

Furthermore, the non-slip portion is made of rubber, whereby the non-slip portion having a larger coefficient of friction than that of the thermoplastic elastomer on the base portion is easily produced.

According to embodiments of the present invention, in addition to the effects described above, because the non-slip portion made of foam rubber or other suitable material is pressed against the window frame, and easily elastically deformed to absorb a dimensional error between the window frame and the glass run channel and contact the window frame over a wide area, there is the effect that the non-slip power is stably exerted. Also, if the non-slip portion is provided in a portion against which the peripheral edge of the window pane is pressed when the window pane is at the closed position, there is the effect that the occurrence of an impact sound is reduced by absorbing an energy when the distal end of the window pane collides against the window pane via the glass run channel.

Furthermore, in embodiments, the non-slip portion is made of thermoplastic elastomer, whereby the non-slip portion can be integrated with the base portion made of the thermoplastic elastomer at higher strength. Also, in a case where the glass run channel is recycled, it can be used as the raw material without separating the non-slip portion from the material making up the base portion.

According to embodiments of the present invention, in addition to the effect described above, because the non-slip portion is made of the olefin thermoplastic elastomer from HDA30 to HDA45, there is the effect that an adequate frictional force with the window frame is obtained and the non-slip portion is excellently joined with the base portion made of the olefin thermoplastic elastomer.

According to embodiments of the present invention, in addition to the effects described above, because a fixing strength between the non-slip portion and the base portion is secured, without causing a risk that the non-slip portion is peeled from the base portion, or dislocated from the base portion or the side wall portions, there is the effect that the dislocation of the glass run channel for vehicle is reliably suppressed.

According to embodiments of the present invention, in addition to the effects described above, because a whole face of the non-slip portion is stably contacted with the bottom face of the window frame, there is the effect that the non-slip portion is pressed over the wide area with greater frictional force to restrict slippage more reliably.

According to embodiments of the present invention, in addition to the effects described above, there is the effect that the glass run channel has a lighter weight, and the non-slip portion is integrated by heat welding easily and strongly.

According to embodiments of the present invention, in addition to the effects described above, because the base portion has a sliding portion having a smaller coefficient of friction in contact with the peripheral edge of the window pane, there is the effect that even when the distal end of the window pane is slightly moved and stopped in a direction along the longitudinal direction of the channel portion, it is possible to reduce a force exerted on the base portion by sliding the window pane and a force tending to move the glass run channel in the longitudinal direction.

According to embodiments of the present invention, in addition to the effects described above, because the contacting lip contacts the window pane on the sliding portion having a smaller coefficient of friction, there is the effect that it is possible to reduce a force exerted on the contacting lip by sliding the window pane and especially a force tending to move the glass run channel disposed on the side portion of the window frame in the longitudinal direction.

According to embodiments of the present invention, in addition to the effects described above, because a longitudinal projection is positioned in contact with the bottom face of the window frame, there is the effect that a predetermined interval is provided between the base portion and the window frame, a pressing force on the non-slip portion pressed between the base portion and the window frame is kept substantially constant and an even and adequate non-slip action is exerted in each portion of the glass run channel.

According to embodiments of the present invention, in addition to the effects described above, because the non-slip portion made of a material having a larger coefficient of friction with respect to the window frame is provided in portions other than the base portion to be pressed against the window frame, there is the effect that the glass run channel is secured at a predetermined position more strongly.

According to the second aspect of the present invention, in the extruded member having the non-slip portion, there is the same effect as the glass run channel for a vehicle according to the first aspect of the present invention, and the effect that the longitudinal movement of the glass run channel, especially the dislocation at the injection molded corner portion from the window frame, is suppressed over the long term of repeated use is obtained.

According to embodiments of the present invention, in addition to the effect of the second aspect of the present invention, because the glass run channel provided at the position against the sliding direction of the window pane is less likely to slide on the window pane, there is the effect that distortion accumulated at the injection molded corner portion is effectively suppressed, the sliding of the glass run channel in the longitudinal direction is suppressed, and the dislocation from the window frame at the corner portion is suppressed. Also, the occurrence of an impact sound is reduced by absorbing the energy when the distal end of the window pane collides via the glass run channel against the window frame.

BRIEF DESCRIPTION OF THE DRAWINGS

These and other objects and advantages of the present invention will become more fully apparent from the following detailed description taken with the accompanying drawings in which.

DETAILED DESCRIPTION OF PREFERRED EMBODIMENTS

The best mode for carrying out the present invention will be described below with reference to the accompanying drawings.

First Embodiment

Figure 1:
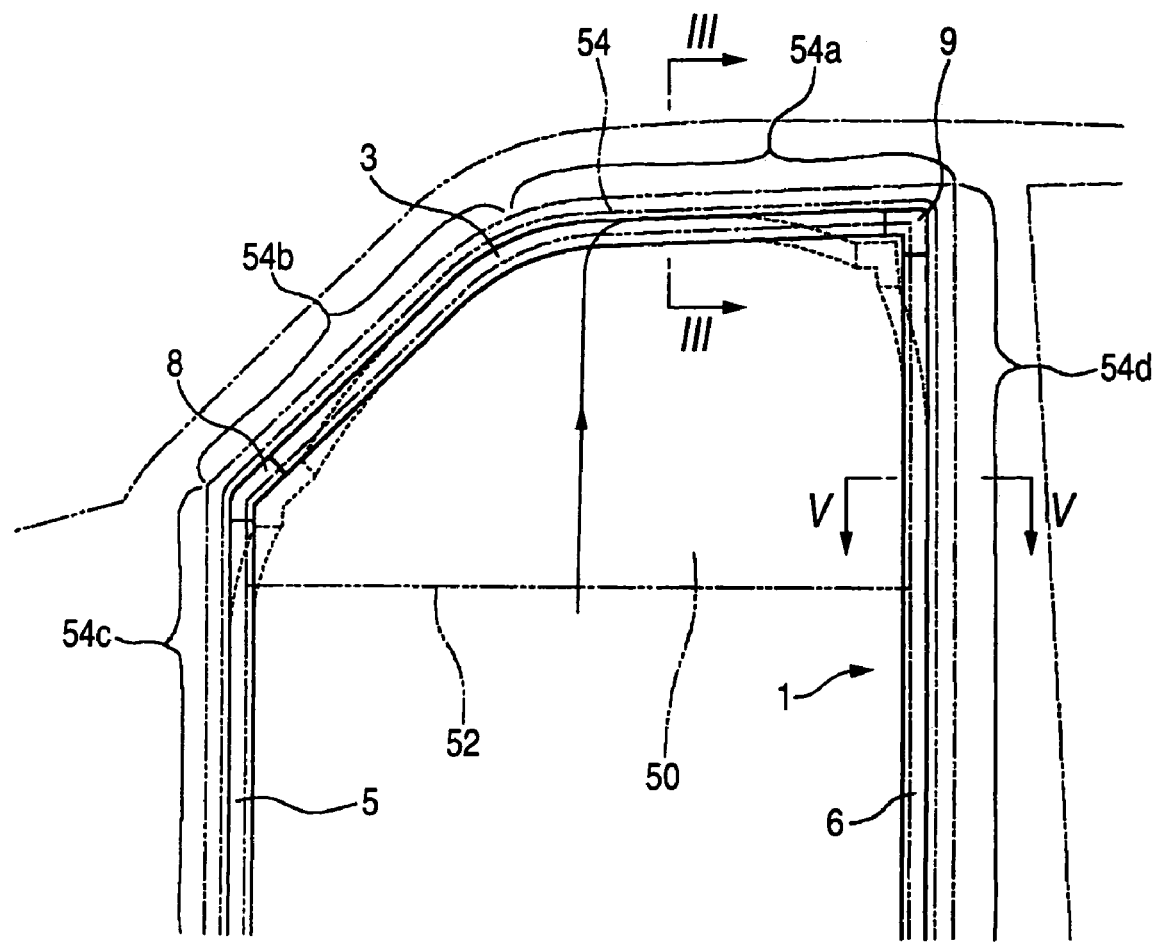
FIG. 1 is a plan view showing how a glass run channel for vehicle according to the present invention is provided and how a conventional glass run channel is dislocated from a window frame.

FIG. 1 shows a glass run channel assembly 1 according to a first embodiment of the present invention is mounted along a window frame 54 having a window pane 50 that is opened or closed by sliding. One form of a mounting portion for the glass run channel assembly 1 will be firstly described. FIG. 1 shows a front door for the vehicle having a window. The window of the door includes a window pane 50 (glass window pane), an opening 52 that is opened or closed by the window pane 50, and a window frame 54 provided in a movable range along a peripheral edge of the window pane 50. The window pane 50 is slidable up and down inside the door and movable between an uppermost position closing the opening 52 and a lowermost position opening the opening 52 at which the window pane is received inside the door.

The window frame 54 includes an upper portion 54a along an upper end of the opening 52, a slanting portion 54b extending from the upper portion 54a slantwise downward in a continuous and integral manner, a front portion 54c extending from the distal end of the slanting portion 54b along a front end of the opening 52, and a rear portion 54d extending from the distal end of the upper portion 54a along a rear end of the opening 52. The front portion 54c and the rear portion 54d extend to a position almost directly under the window pane 50.

Figure 3:
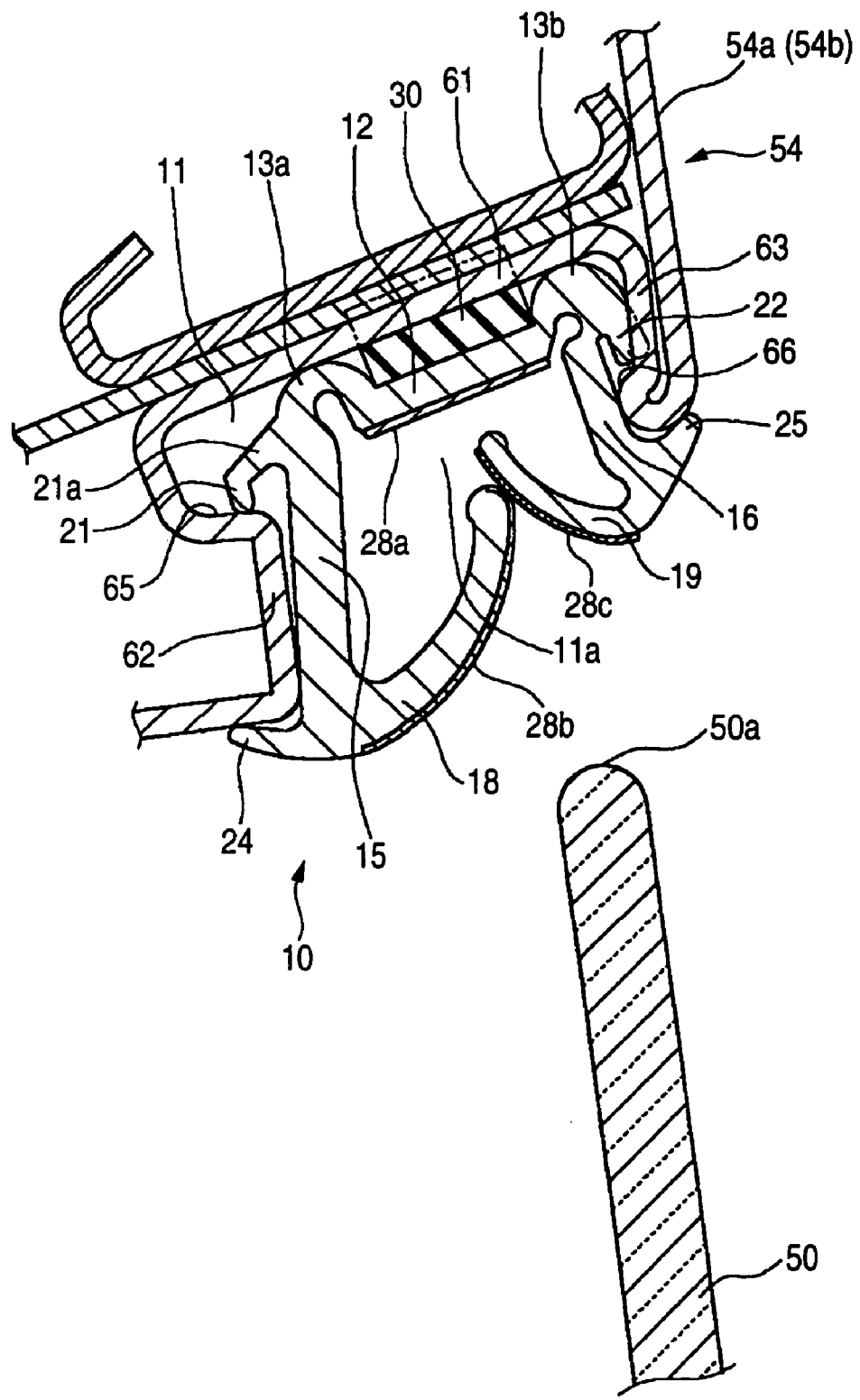
FIG. 3 is a cross-sectional view of the glass run channel for a vehicle of FIG. 2, taken along the line III-III of FIG. 1, in a state where the glass run channel is mounted on the window frame and before the window pane is closed.

The window frame 54 is made of a metallic strip member by roll forming, or made of a metal plate by press molding, and formed into a well known shape, and has a rectangular groove 11 (See FIG. 3) into which the glass run channel assembly 1 is inserted and fixed and the window pane 50 is insertable. FIG. 3 is a cross-sectional view of the glass run channel assembly 1 of FIG. 1 mounted on the window frame 54 in a state before the window pane 50 is closed, taken along the line III-III. The window frame 54 is a portion opposed to a peripheral edge 50a of the window pane 50, and includes a frame base portion 61 making up a bottom of the groove 11, and frame side portions 62, 63 formed on respective sides of the frame base portion 61 in the width direction to stand continuously from the frame base portion 61.

Both the frame side portions 62, 63 include engagement portions 65, 66 protruding into the groove 11 to hold the glass run channel assembly 1 in the groove 11. In this embodiment, the interior engagement portion 65 is formed like a concave face protruding widthwise to a frame side portion 62. Also, the exterior engagement portion 66 is formed from the distal end of a frame side portion 63 slantwise with respect to the other frame side portion 62, the entire frame side portion 63 being formed concave from an open portion of the groove 11. These engagement portions 65, 66 are engaged by projections 21, 22 of a glass run channel 10 to secure the glass run channel assembly 1 to the window frame 54.

The glass run channel assembly 1 is substantially linear on the portions corresponding to the upper portion 54$a$, the slanting portion 54$b$ provided continuous to the upper portion 54$a$, and the front and rear portions 54$c$, 54$d$ of the window frame 54. When the glass run channel assembly is mounted in a bent manner along a curve of the window frame 54 between the upper portion 54$a$ and the slanting portion 54$b$ of the window frame 54, the glass run channel assembly 1 has a curvilinear outer shape substantially equivalent to that of the window frame 54, as shown in FIG. 1. The glass run channel assembly 1 includes an extruded upper member 3 that mounts on the upper portion 54$a$ and the slanting portion 54$b$ of the window frame 54, and the extruded side members 5, 6 corresponding to the front portion 54$c$ and the rear portion 54$d$. Extruded side members 5, 6 have one end joined with one end of injection molded corner members 8, 9 and are thereby integrated with the extruded upper member 3 joined at the other end of the injection molded corner members 8, 9. The extruded upper member 3 and the extruded side members 5, 6 are long members extending substantially linearly and molded by extrusion. These extruded members 3, 5 and 6 may have different cross-sectional shapes. Also, the injection molded corner members 8, 9 are members molded by insert injection to capture the ends of the extruded members 3, 5 and 6, and have a shape bent at an angle corresponding to an intersection angle between the slanting portion 54$b$ and the front portion 54$c$ and between the upper portion 54$a$ and the rear portion 54$d$ of the window frame 54.

In the glass run channel assembly 1, at least one of, or part of one of, the extruded members 3, 5 and 6 is made up of the glass run channel according to the present invention. The extruded member 3 is preferably made up of the glass run channel according to the present invention. Particularly, the extruded member mounted on the slanting portion 54$b$ extending slantwise at a certain angle more than a perpendicular angle to the sliding direction of the window pane 50 on the upper portion of the window frame 54 is preferably the glass run channel according to the present invention. In the glass run channel assembly 1 of this embodiment, all the extruded members 3, 5 and 6 may be made up of the glass run channel of the present invention, and formed in the same shape of cross section.

In the glass run channel assembly 1, the extruded members 3, 5 and 6 and the injection molded corner members 8 and 9 have substantially the same overall configuration, except for a non-slip portion, described in more detail hereafter, provided on the glass run channel according to the present invention. The injection molded corner members 8 and 9, like the extruded members, may be provided with the non-slip portion. Also, the extruded members 3, 5 and 6 may or may not have the same cross sectional shape. When they have different cross sectional shapes, the injection molded corner members 8 and 9 are formed to have a cross sectional shape smoothly transitioning in the longitudinal direction so as to conform with the cross sectional shape of the extruded members 3, 5 and 6 as appropriate.

Referring to FIGS. 2 to 5, a detailed structure of the glass run channel (particularly the extruded members 3, 5 and 6) making up the glass run channel assembly 1 of the first embodiment will be described below in terms with the constitution of the glass run channel 10 and the mounted state.

Figure 2:
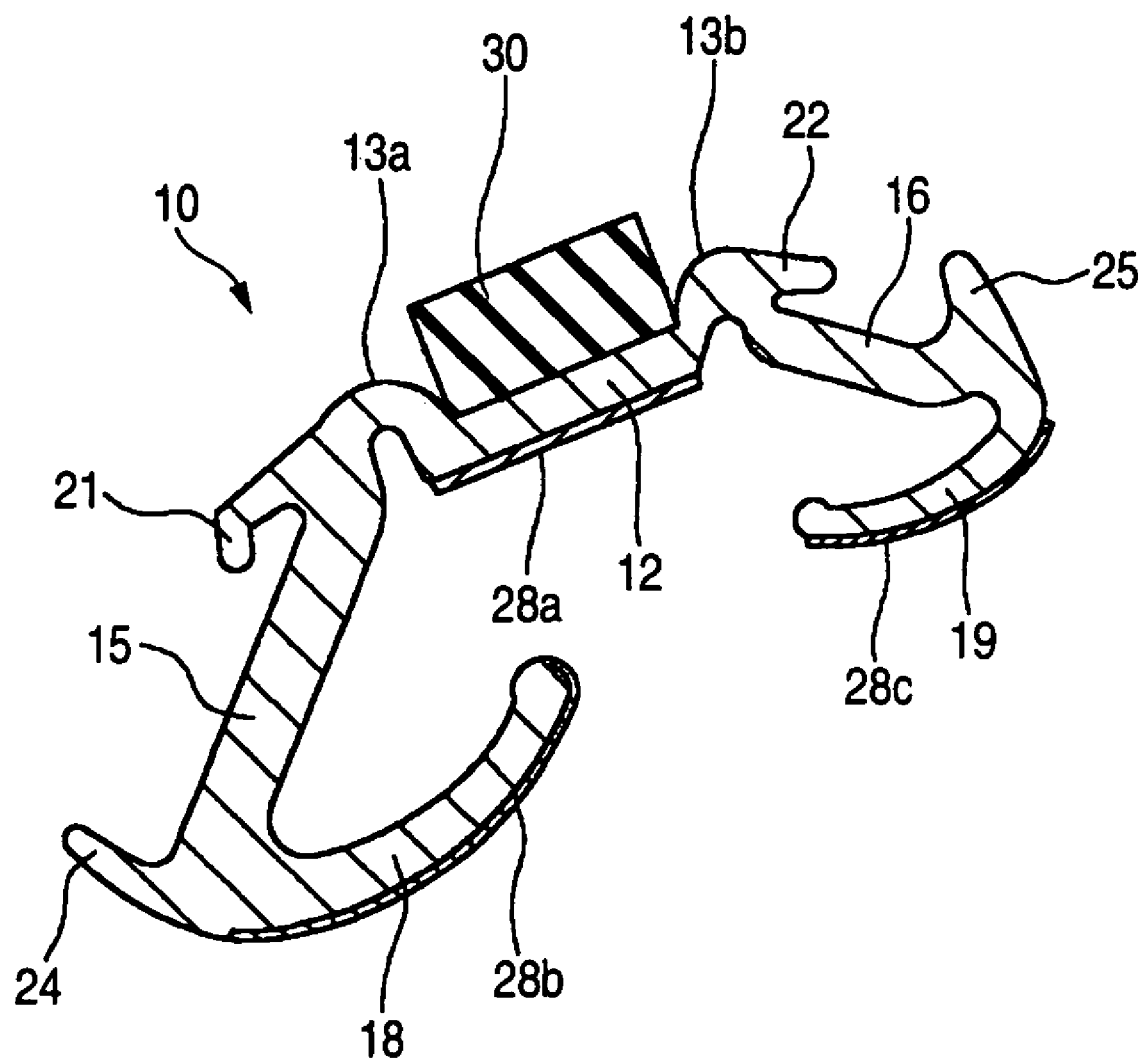
FIG. 2 is a cross-sectional view showing a free state of a glass run channel for a vehicle according to a first embodiment of the present invention.

The glass run channel 10 includes a base portion 12, an interior side wall portion 15, an exterior side wall portion 16, an interior contacting lip 18, an exterior contacting lip 19, an interior projection 21, an exterior projection 22, and a non-slip portion 30. Referring to FIG. 2, the shape and positional relation of each portion in the glass run channel 10 will be described below.

The base portion 12 and the side wall portions 15, 16 are portions forming a channel portion 11$a$ (see FIG. 3) into which a peripheral edge of the window pane 50 is inserted. The base portion 12 is the portion forming a face opposed to a peripheral edge 50$a$ of the window pane 50 in the channel portion 11$a$, and is typically formed like a flat plate extending in the longitudinal direction. In this embodiment, one pair of longitudinal projections 13$a$, 13$b$ projecting to the frame base portion 61 of the window frame 54 is provided at respective ends of the base portion 12 in the width direction. Also, a face of the longitudinal projections 13$a$, 13$b$ that is opposite to the projecting direction is formed like a concave groove with respect to the central part of the base portion 12 to serve as the center of deformation of the side wall portions 15, 16, as will be described later.

The side wall portions 15, 16 are portions forming respective side faces of the channel portion 11$a$, extend continuously to stand from respective ends (longitudinal projections 13$a$, 13$b$) of the base portion 12 in the width direction, and are formed like a flat plate. The side wall portions 15, 16 are integrally molded to make an obtuse angle to the base portion 12 in a free state before being mounted on the window frame 54 (see FIG. 2), and formed to be elastically deformable around a continuous part (the projections 13$a$, 13$b$) to the base portion 12.

At the distal end of the side wall portions 15, 16, contacting lips 18, 19 that respectively contact the front and back faces of the window pane 50 are provided. The contacting lips 18, 19 are elastically deformable, and extend from the distal end of the side wall portions 15, 16 toward the base portion 12.

Also, on the opposite side of the contacting lips 18, 19 at the distal end of the side wall portions 15, 16, elastically deformable cover lips 24, 25 are integrally molded with the side wall portions 15, 16. The cover lips 24, 25 cover a gap between the window frame 54 and the glass run channel 10.

The projections 21, 22 are portions that engage the window frame 54, and project from the base portion 12 or the side wall portions 15, 16 outwards widthwise on both sides of the glass run channel 10 in the width direction. In this embodiment, the interior projection 21 is bent to have its distal end substantially parallel to the side wall portion 15 via the main portion 21$a$ of the projection, which projects from the lower part of the side wall portion 15 and extends slantwise with respect to the distal end of the side wall portion 15. Also, the exterior projection 22 is formed to project slantwise from the longitudinal projection 13$b$ of the base portion 12 outwards in the width direction of the side wall portion 16 and extend substantially straightly.

In this embodiment, at least the base portion 12 and the side wall portions 15, 16 of the glass run channel 10 are made of a thermoplastic elastomer, preferably as a whole except for a non-slip portion 30 made of rubber. The thermoplastic elastomer may be an olefin thermoplastic elastomer, a vinyl thermoplastic elastomer, a styrene thermoplastic elastomer, or a urethane thermoplastic elastomer. Preferably, an olefin thermoplastic elastomer is employed, because the glass run channel for vehicle 10 is thereby reduced in weight, and the bonding strength with respect to the non-slip portion 30 is kept excellent.

On a face of the base portion 12 of the glass run channel 10 facing the frame base portion 61 of the window frame 54 (an upper face of the base portion 12 in FIG. 2), the non-slip portion 30 made of foam rubber (sponge rubber) is integrally provided. The non-slip portion 30 restricts the glass run channel 10 from slipping along the window frame 54 in the longitudinal direction in a state where the glass run channel 10 is mounted on the window frame 54. It is preferable that the non-slip portion 30 is continuously provided along the longitudinal direction of the base portion 12, because non-slip effect for each portion of the glass run channel 10 thereby becomes uniform and the frictional force becomes greater. Also, it is preferable that the non-slip portion 30 has a large contact area with the window frame 54 in the shape of a flat plate, for example, because even if a force for sliding the glass run channel 10 with respect to the window frame 54 is exerted, a greater frictional force is produced.

The non-slip portion 30 is formed in such a thickness that the top end extends beyond the longitudinal projections 13a, 13b in free state, as shown in FIG. 2. When the glass run channel 10 is mounted on the window frame 54, the non-slip portion 30 is compressed between the base portion 12 and the frame base portion 61 of the window frame 54 and pressed against the frame base portion 61, increasing the frictional force under a vertical load, as shown in FIG. 3. Therefore, the shape of the projections 21, 22 is set up to provide a holding power sufficient to restrict the base portion 12 from floating from a predetermined position of the window frame 54 due to a restoring force that urges the non-slip portion 30 to return to its original shape.

Figure 4:
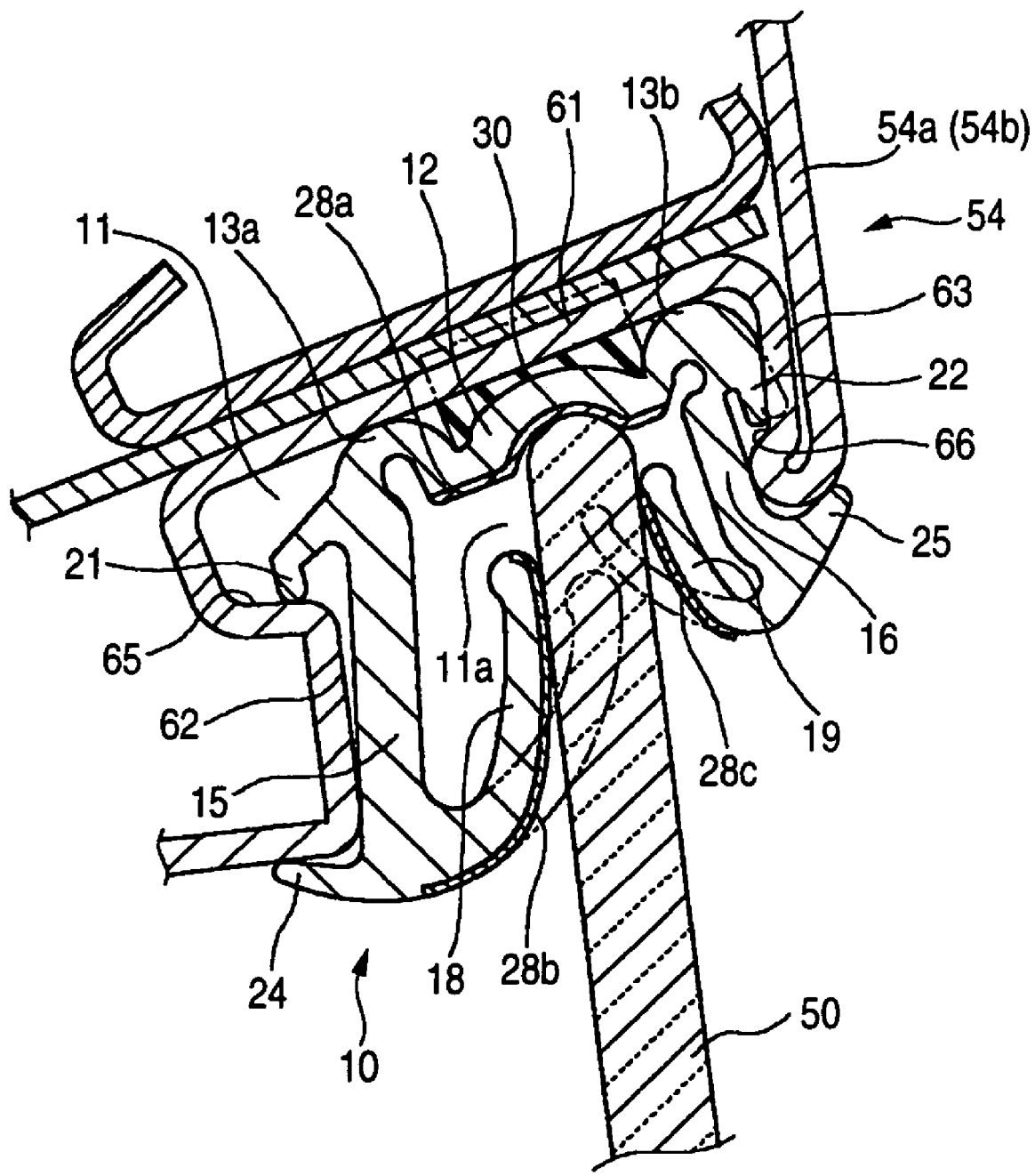
FIG. 4 is a cross-sectional view of the glass run channel for a vehicle in a state where the window pane of FIG. 3 is closed.

The non-slip portion 30 is preferably made of a resin material (including rubber, synthetic resin and/or a thermoplastic elastomer) having a greater coefficient of friction with the window frame 54 than that of the thermoplastic elastomer constituting the base portion 12, and is made of a rubber material in the first embodiment. When the non-slip portion 30 is made of rubber, solid rubber (non-foam rubber) containing EPDM, fine foam rubber having an expansion ratio of about 1.1. to 1.4, or foam rubber (sponge rubber) having an expansion ratio of about 1.5 to 5 may be employed. A foam rubber having an expansion ratio of about 2 to 3 and prone to compressive deformation is preferable. The non-slip portion 30 of the embodiment is made of foam rubber composed of EPDM, and is like a flat plate having a width between the longitudinal projections 13a, 13b of the base portion 12, and in a free state, having about double the thickness as when it is mounted on the window frame and the window pane is closed (as shown in FIG. 4).

When the non-slip portion 30 made of solid rubber is mounted on the window frame, the thickness is reduced as compared to foam rubber so as to achieve the same effect as foam rubber, because the compression ratio of thickness to be pressed against the frame base portion 61 of the window frame 54 is smaller than that of foam rubber.

In the specification, the coefficient of friction of the non-slip portion with respect to the window frame is the coefficient of static friction with respect to the surface contact with the glass run channel (assembly) of the window frame 54. For example, in the window frame 54 of a closing door for the typical vehicle, the same membrane as the outer package of the vehicle, namely, a membrane of acrylic resin or acrylic urethane resin treated by burning, is provided, whereby the coefficient of friction with the membrane becomes the coefficient of friction with respect to the window frame. The coefficient of friction with respect to the non-slip portion 30 is preferably 1.5 or more, and more preferably 1.8 or more.

In the specification, the coefficient of friction of the non-slip portion and the material composing the non-slip portion is the coefficient of static friction, which is measured by the following test method.

1. Two specimens made of intended material having a width of 5 mm, a thickness of 2 mm and a length of 40 mm are prepared.

2. A plate metal jig 50 mm×50 mm and having a thickness of about 1 mm is prepared, and two specimens are secured on one face of this jig by double coated adhesive tapes to be parallel at an interval of 30 mm to one pair of sides of the jig.

3. The plate metal jig is placed on an acrylic resin coated plate with its face having the specimens secured directed downwards, and a weight of 700 g including a weight of the plate metal jig is placed on the plate metal jig.

4. The plate metal jig is pulled in a direction perpendicular to the longitudinal direction of the specimen, and the load F' (N) at a time when the specimen begins to be dislocated from the surface of the coated plate is measured.

5. Calculate from a coefficient of static friction $\mu'=F'/w$. Incidentally, w is the total weight (N) of the plate metal jig and the weight.

In the glass run channel 10 of the embodiment, further, sliding portions 28a, 28b and 28c are formed on the base portion 12 and the contacting lips 18, 19 forming the inner face of the channel portion 11a, namely, on the faces that contact with the sliding window pane 50, as shown in FIGS. 2 to 5. The sliding portions 28a, 28b and 28c are surface layers made of a material having a smaller coefficient of friction with respect to the window pane than that of the thermoplastic elastomer constituting the base portion 12 and the contacting lips 18, 19. The sliding portions 28a, 28b and 28c may be in a well known form, for example, a coating layer formed by applying a coating agent mainly composed of flocked nylon pile, nylon resin or urethane resin on each surface. Also, the sliding portions may be made of a thermoplastic elastomer layer or a very high molecular weight polyolefin composition layer containing a harder component (thermoplastic resin component) than the constituent material of the base portion 12 or the contacting lips 18, 19, whereby the sliding portions 28a to 28c can be integrally formed by co-extrusion together with the molding of the base portion 12 and the contacting lips 18, 19.

Referring to FIG. 3, the form of mounting the glass run channel 10 on the window frame 54 will be described below. When the glass run channel 10 is mounted on the window frame 54, the distal end of the side wall portions 15, 16 is inserted from the base portion 12 into the groove 11 of the window frame 54, while being elastically deformed to the channel portion 11a. The glass run channel 10 is mounted by pushing the base portion 12 opposed to the frame base portion 61 of the window frame 54, until the longitudinal projections 13a, 13b make contact with the frame base portion 61 of the window frame 54, while the non-slip portion 30 is being elastically compressed. In the inserting operation, the projections 21, 22 are elastically deformed in a direction to approach each other upon contacting with the opening edge of the window frame 54, and pushed in, while sliding with the inner face of the window frame 54 in reduced width in cooperation with the elastic deformation of the side wall portions 15, 16. Simultaneously when the projections 21, 22 pass through the engagement portions 65, 66 of the window frame 54, the projections 21, 22 are elastically restored toward their original shapes to hold the glass run channel 10 at the predetermined position of the window frame 54 in a state where the non-slip portion 30 is compressed by a predetermined amount. In the state, a holding power of the projections 21, 22 is set up to restrict the glass run channel 10 from floating from the window frame 54 against a repulsion of the non-slip portion 30, as previously described. Moreover, in the inserting operation, the non-slip portion 30 does not contact with the frame side portions 62, 63 of the window frame 54 to block the inserting operation, whereby the mounting operability of the glass run channel 10 is maintained favorable, irrespective of the non-slip portion 30.

The side wall portions 15, 16 deflect outward toward their original state, thereby contacting the frame side portions 62, 63 of the window frame 54 and thereby completing the mounting of the glass run channel 10 on the window frame 54.

In the mounted state, the projection 21 located on the vehicle interior side enter a concave portion and is engaged by the engagement portion 65, while the projection 22 located on the vehicle exterior side is pressed against the frame side portion 63, and is engaged by the engagement portion 66. Also, the base portion 12 and the side wall portions 15, 16 form the channel portion 11a like a U-character in cross section through which the windowpane 50 is inserted. The cover lips 24, 25 cover the distal end portion of each frame side portion 62, 63 in the window frame 54, to shield a gap between the glass run channel 10 and the window frame 54 and form a design of the portion. In this state, the non-slip portion 30 is pressed against the frame base portion 61 of the window frame 54 in a compressed state.

Figure 5:
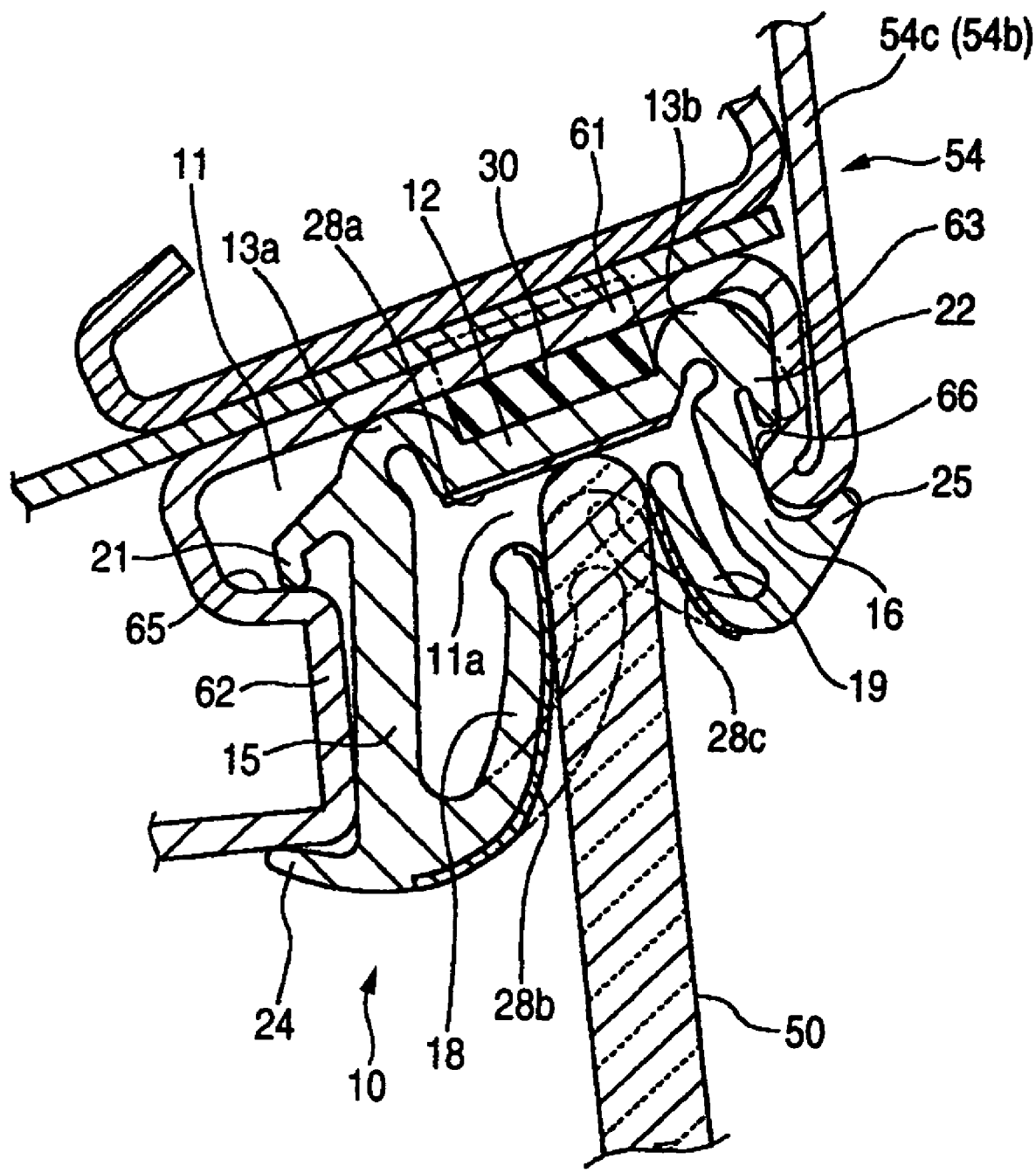
FIG. 5 is a cross-sectional view of the glass run channel for a vehicle of FIG. 2, taken along the line V-V of FIG. 1, in a state where the glass run channel is provided in a side portion of the window frame as shown in FIG. 1 and the window pane is contact with it.

Referring to FIGS. 3 to 5, the condition of the glass run channel 10 when the window pane 50 is slid along the window frame 54 with the glass run channel 10 mounted will be described below.

FIG. 4 shows a state where the window pane 50 of FIG. 3 is closed, and FIG. 5 is a cross-sectional view taken along the line V-V in FIG. 1.

In FIGS. 3 and 4, the glass run channel 10 mounted on the upper portion 54a and the slanting portion 54b of the window frame 54 does not make contact with the window pane 50, and is held in a state as shown in FIG. 3, when the window pane 50 is located under the vicinity of the uppermost position, namely, the window portion is opened. When the window pane 50 is slid upwards to approach the uppermost position, first of all, the window pane 50 makes contact with the contacting lips 18, 19. The contacting lips 18, 19, which are elastically deformed, make elastic contact with both the faces of the window pane 50 without blocking the movement of the window pane 50.

Moreover, if the window pane 50 rises further, the peripheral edge 50a of the window pane 50 makes contact with the back face of the base portion 12, and further presses the base portion 12 towards the frame base portion 61 of the window frame 54 (see FIG. 4). In the form in which the window pane 50 is slid only up or down in accordance with a linear locus of movement, the window pane 50 makes contact with the contacting lips 18, 19 and the base portion 12.

On the other hand, in the constitution where a locus of movement of the window pane 50 is slightly slid near the uppermost position toward the rear (to the right in FIG. 1) of the vehicle body, owing to the characteristics of a lifting mechanism within the door, as indicated by the arrow in FIG. 1, the window pane 50 is moved along the longitudinal direction of the channel portion 11a (i.e., a direction orthogonal to the paper in FIG. 4) in contact with the contacting lips 18, 19 and the base portion 12, as shown in FIG. 4. At the time, since the window pane 50 is moved while sliding with the base portion 12 and the contacting lips 18, 19, a force tending to move the glass run channel 10 in a movement direction of the window pane 50 is exerted.

At the time, since the non-slip portion 30 is pressed against the frame base portion 61 of the window frame 54, the static frictional force of the glass run channel 10 with the window frame 54 is increased. Therefore, even if the glass run channel 10 is subjected to a force of the window pane 50 to move in the same direction as the movement of the window pane 50, the glass run channel 10 is less likely to slide on the window frame. Since the non-slip portion 30 is in a pressed state, a load in perpendicular angle direction, namely, a force acting to press the base portion 12 against the frame base portion 61 of the window frame, is increased, and the static frictional force is proportionally increased. The static frictional force is further increased after the peripheral edge 50a of the window pane makes contact with the back face of the base portion 12, because the perpendicular angle load on the non-slip portion 30 is further increased. In particular, a whole face of the non-slip portion 30 is intimately contacted with the frame base portion 61 of the window frame 54 with a large contact area, so that the static frictional force is increased. Accordingly, even though the window pane 50 has a locus of movement in which it moves along the longitudinal direction when pressed against the glass run channel 10, the glass run channel 10 is less likely to slide in the longitudinal direction on the window frame 54, and is stably held at the predetermined position.

In this embodiment, since the contacting lips 18, 19 and the base portion 12 include the sliding portions 28a to 28c, there is a smaller frictional force acting on the window pane 50 and the contacting lips 18, 19, so that the force for moving the glass run channel 10 in the longitudinal direction along the window frame 54 is reduced. For example, in the glass run channel located at the slanting portion 54b of the window frame 54, when the peripheral edge 50a of the window pane makes contact with the back face of the base portion 12, part of a lift-up force of the window pane 50 is converted into a slantwise upper force along the slanting portion 54b (a force in a direction orthogonal to the paper in FIG. 3), acting as a force for pushing up the glass run channel slantwise on the slanting portion 54b. However, if the sliding portion 28a is formed on the surface of the base portion 12 as in the embodiment, the peripheral edge 50a of the window pane easily slides on the sliding portion 28a, when the peripheral edge 50a of the window pane 50 makes contact with the base portion 12, reducing the force tending to move the glass run channel 10 along the slanting portion 54b of the window pane 54. Accordingly, the sliding of the glass run channel 10 on the window frame 54 is restricted effectively. The action of the sliding portions 28a to 28c is also effective for restricting sliding of the glass run channel 10 disposed on the upper portion 54a, the front portion 54c and the rear portion 54d.

The window pane 50 is moved while the peripheral edge of the window pane 50 is elastically deforming the base portion 12 and the non-slip portion 30, and stopped at the uppermost position, namely in closed state, as shown in FIG. 4. At this time, since the base portion 12 and the non-slip portion 30 are interposed between the frame base portion 61 of the window pane and the window pane 50, the impact on the window frame 54 is reduced, and an impact energy is absorbed by elastic deformation of the base portion 12 and the non-slip portion 30, thereby reducing an impact sound. In particular, if the non-slip portion 30 is made in great thickness of a material that is easily elastically deformable such as foam rubber, there is the high effect of suppressing the occurrence of impact sound. In the state where the window pane 50 is closed, the contacting lips 18, 19 contact with both faces of the window pane, whereby the glass run channel 10 seals a gap between the window frame 54 and the window pane 50.

Also, in the glass run channel 10 provided on the side portions 54c, 54d of the window frame 54, the peripheral edge of the window pane 50 is always placed in at least a part of the channel portion 11a in the longitudinal direction, and the window pane 50 is contact with the contacting lips 18, 19, as shown in FIG. 5. In this state, the window pane 50 slides along the longitudinal direction (direction orthogonal to the paper in FIG. 5) of the glass run channel 10. Since the non-slip portion 30 is pressed against the frame base portion 61 on the side portions 54c, 54d of the window frame 54, there is an additional force for restricting the glass run channel 10 from being moved with respect to the window frame 54. Moreover, if the sliding portion 28a is formed on the back face of the base portion 12, the peripheral edge 50a contacting the back face of the base portion 12 is moved in contact with the sliding portion 28a, when the window pane 50 is moved, whereby the force tending to move the glass run channel 10 is reduced. Also, the force of the sliding window pane 50 tending to move the glass run channel 10 in the longitudinal direction is reduced by the sliding portions 28b and 28c provided on the contacting lips 18, 19. Therefore, the glass run channel 10 is effectively restricted from being slid on the window pane on the side portions of the window pane.

Accordingly, the glass run channel 10 is restricted from being slid with respect to the window pane in the longitudinal direction of the glass run channel 10, namely, the direction along the window pane 54, and thus dislocation is restricted from occurring. Therefore, compressive force or tensile force in the longitudinal direction is less likely to be concentrated at the corner portions (8, 9), and dislocation from the window frame 54, such as is shown in FIG. 1, does not occur. Accordingly, the glass run channel assembly 1 is less likely to produce the compressive force or tensile force due to its sliding on the window frame, whereby dislocation from the window frame 54 is restrained excellently.

The glass run channel according to the present invention can be manufactured by arbitrary methods. For example, the thermoplastic elastomer portion and the non-slip portion made of rubber can be extruded separately, and then integrated by bonding or heating and welding. The non-slip portion made of rubber may be preliminary extruded and vulcanized, and then supplied into a mold for extrusion, when the thermoplastic elastomer material is extruded, so as to be welded together. Also, a manufacturing line of the thermoplastic elastomer portion can be provided following a manufacturing line of the non-slip portion, such that the vulcanized non-slip portion is supplied into the mold for extrusion for the thermoplastic elastomer material and welded together with the glass run channel, whereby the glass run channel is manufactured through a continuous process.

Second Embodiment

Figure 6:
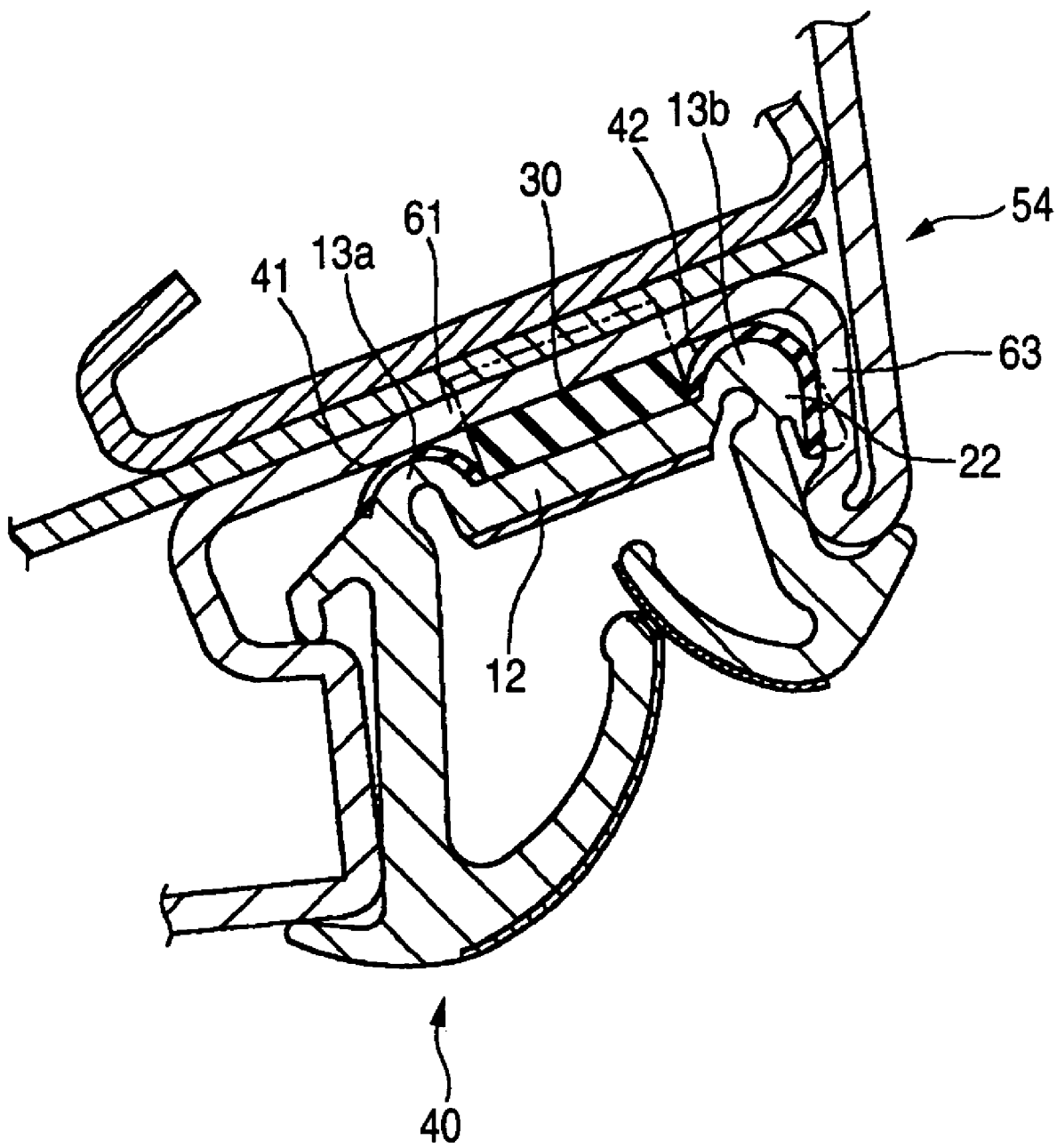
FIG. 6 is a cross-sectional view of a glass run channel for a vehicle according to a second embodiment of the present invention in a state where the glass run channel is mounted on a window frame.

A second embodiment as shown in FIG. 6 is a glass run channel 40 having a non-slip portion of a different shape from that of the glass run channel 10 of the first embodiment. That is, a glass run channel 40 of the second embodiment includes, in addition to the non-slip portion 30, layered non-slip portions 41, 42 made of solid rubber on the projecting faces of the longitudinal projections 13a, 13b on the base portion 12 of the glass run channel 40. In this form, the longitudinal projections 13a, 13b keep the distance between the center of the base portion 12 and the frame base portion 61 of the window frame 54 at a certain value, and further increase the frictional force between the window frame 54 and the longitudinal projections 13a, 13b, compared to the above form. In particular, since the longitudinal projections 13a, 13b are strongly pressed against the frame base portion 61, the glass run channel 40 is made less likely to slide on the window frame 54 by providing the non-slip portion 30 on these portions.

In FIG. 6, the exterior non-slip portion 42 covers the face of the exterior projection 22 to be pressed against the window frame 54, whereby the projection 22 is pressed against the frame side portion 63 of the window frame 54 to produce a larger static frictional force with respect to the window frame 54 in the same way, resulting in the greater effect of suppressing the sliding.

Third Embodiment

Figure 7:
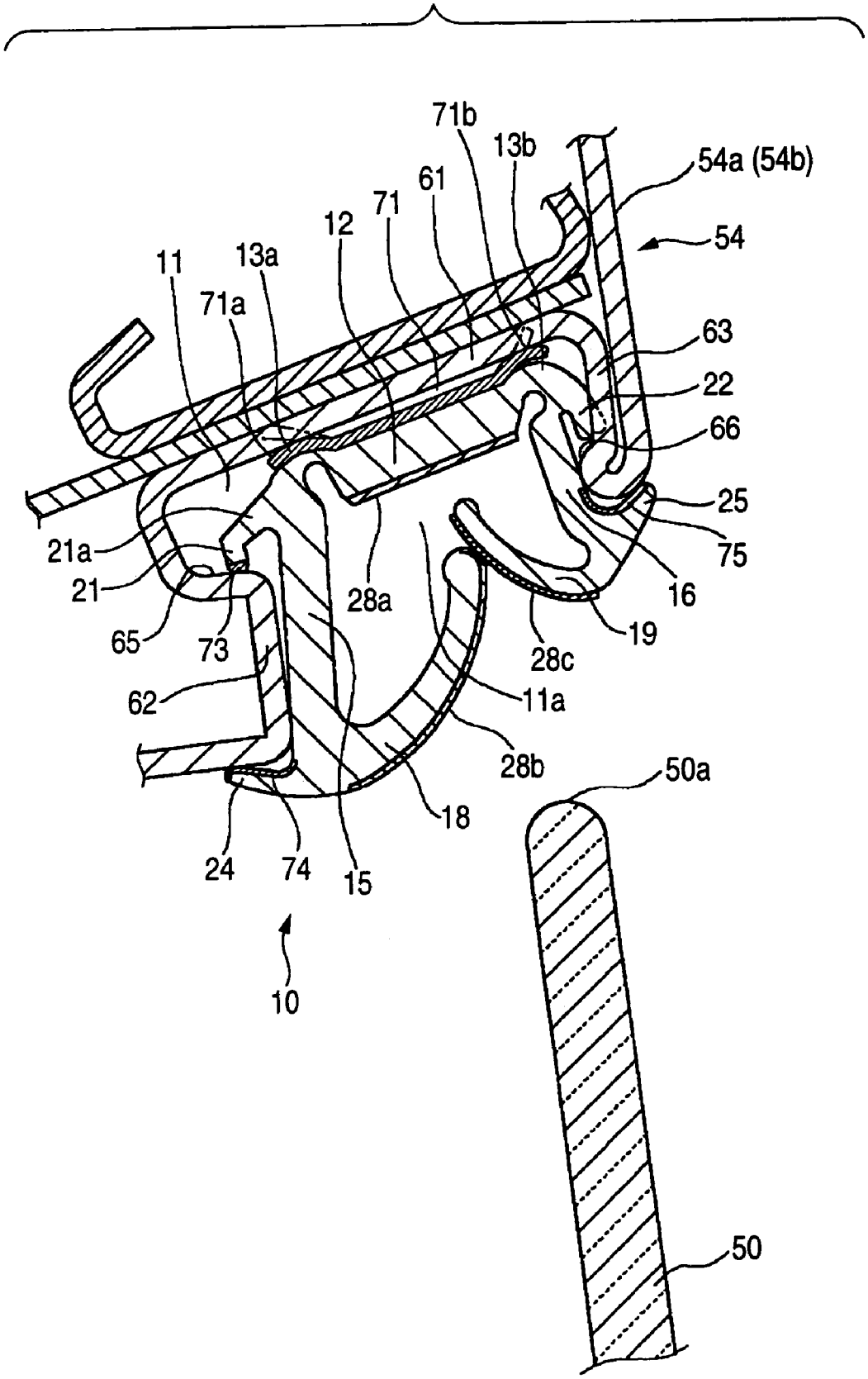
FIG. 7 is a cross-sectional view of a glass run channel for a vehicle according to a third embodiment of the present invention in a state where the glass run channel is mounted on a window frame.
Figure 8:
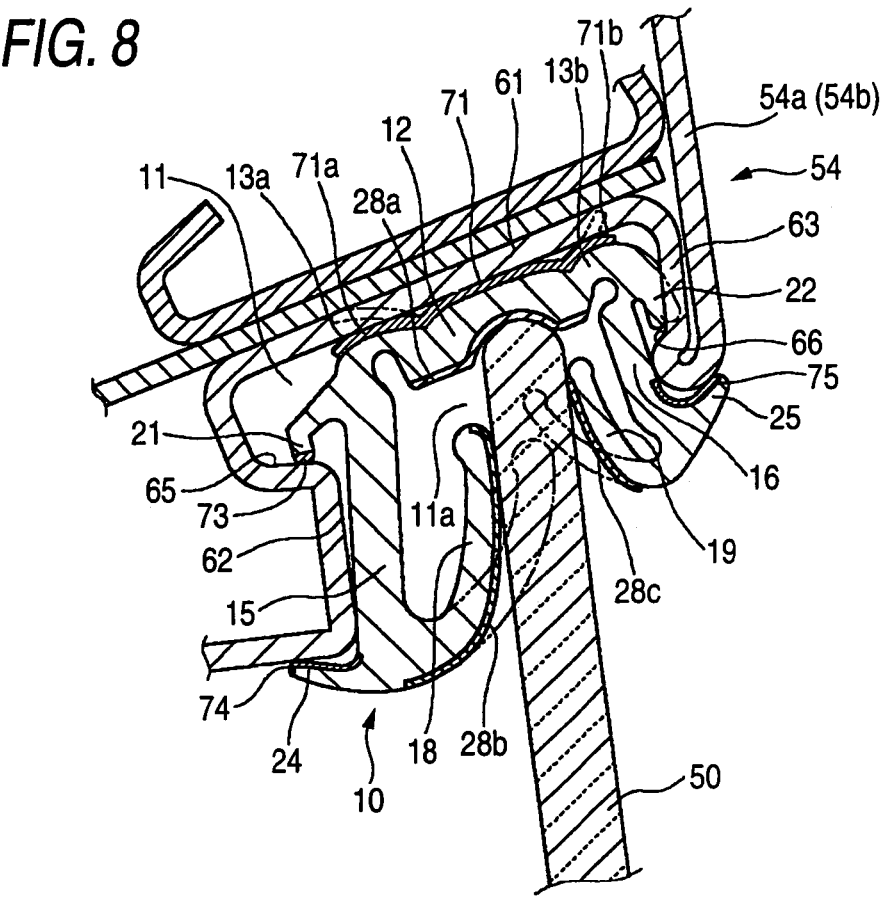
FIG. 8 is a cross-sectional view showing a state where the window pane of FIG. 7 is closed.

FIGS. 7 and 8 show how a glass run channel 70 according to a third embodiment of the present invention is mounted on the window frame 54. In the glass run channel 70, the same or like parts are designated by the same numerals as those of the glass run channel 10 in the first embodiment, and not described in further detail. The glass run channel 70 includes a non-slip portion 71 extending to at least partially cover the longitudinal projections 13a, 13b on the base portion 12, and non-slip portions 73, 74 and 75 attached to the projection 21 and the cover lips 24, 25.

The non-slip portion 71 of the third embodiment may be made of a thermoplastic elastomer. That is, though the non-slip portion 71 may be made of rubber, the non-slip portion 71 may be made of various kinds of resin material like the thermoplastic elastomer having a larger coefficient of friction with respect to the window frame 54 than that of the base portion 12 and in which the non-slip portion 71 is excellently joined with the base portion 12. Typically, those resin materials have rubber elasticity. Since the non-slip portion 71 is required to have a larger coefficient of friction than that of the base portion 12, it may be made of various kinds of thermoplastic elastomer, such as vinyl, styrene and/or urethane, in the same way as the base portion 12. It is preferable that a thermoplastic elastomer in the same system and having the same or similar SP value as the base portion 12 is employed, because the fixing strength is easily enhanced by welding. More specifically, a non-slip portion made of an olefin thermoplastic elastomer is preferable, because the non-slip portion 71 has a lighter weight and higher strength. Also, the glass run channel 70 having the non-slip portion 71 made of a thermoplastic elastomer does not need a vulcanizing process, and is integrated by co-extrusion, so that it is manufactured by a simple manufacturing method.

The thermoplastic elastomer preferably has a durometer type A (shore A) hardness as defined in JIS K7215 from 20 to 70, or from HDA 20 to 70. If the hardness is below HDA 20, the strength and/or durability easily decreases. Also, if the hardness is beyond HDA 70, a coefficient of friction of 1.8 or more is not easily obtained. Accordingly, a thermoplastic elastomer from HDA 20 to 70 produces an excellent frictional force with the coated face of the general window frame 54 used for the vehicle, and is durable for the long term service. More preferably, the thermoplastic elastomer has a hardness from HDA 30 to 60.

The coefficient of friction is preferably 1.5 or more, and more preferably 1.8 or more, like the non-slip portion made of rubber.

The non-slip portion 71 is layered and fixed on the base portion 12, and includes thin plate-like portions 71*a*, 71*b* protruding at a certain angle from both ends of the base portion 12 in the width direction on the portions corresponding to the longitudinal projections 13*a*, 13*b*. Because the non-slip portion 71 is fixed to the base portion 12 in the central part thereof in the width direction, and both end portions of the non-slip portion in the width direction are separated from the base portion 12 and protruded, the non-slip portion 71 stably contacts the window frame 54.

The non-slip portions 73, 74 and 75 are layered on the portions where the glass run channel 70 is pressed against the window frame 54, and made of a resin material having a larger coefficient of friction than that of the thermoplastic elastomer in the base portion 12 or other portions of the glass run channel. The non-slip portions 73, 74 and 75 may be made of rubber or the thermoplastic elastomer like the non-slip portion. It is preferable to select the same material for the non-slip portion, because the manufacturing is facilitated. Also, the non-slip portion 73 is made of a material having a larger coefficient of friction with the window frame 54 than that of the material of the projection 21. Also, the non-slip portion 74 is made of a material having a larger coefficient of friction with respect to the window frame 54 than that of the material of the cover lip 24, and the non-slip portion 75 is made of a material having a larger coefficient of friction with respect to the window frame 54 than that of the material of the cover lip 25. In the embodiment as shown in FIG. 7, the non-slip portion 71 and all the non-slip portions 73, 74 and 75 are made of the same olefin thermoplastic elastomer integrally with the glass run channel 70 by co-extrusion.

This glass run channel 70 is mounted on the window frame 54 in the same way as the glass run channel 10 of the first embodiment. In particular, the non-slip portions 73, 74 and 75 are portions less likely pressed against the frame side portions 62, 63 of the window frame 54, when inserted into the window frame 54, whereby the operability is maintained excellent. In a state where they are completely mounted on the window frame 54, the non-slip portion 73 is pressed against the engagement portion 65, and the non-slip portions 74, 75 are pressed against the top portion of the frame side portions 62, 63, as shown in FIGS. 7 and 8, so that the glass run channel 70 is restricted from being slid on the window frame 54 in the longitudinal direction. The thin plate-like portions 71*a*, 71*b* of the non-slip portion 71 are pressed against the window frame 54 and contacted by the longitudinal projections 13*a*, 13*b*. On the other hand, a central part of the non-slip portion 71 corresponding to the base portion 12 is kept away from the window frame 54, or slightly contacted with the window frame 54, in a state where the glass run channel is mounted on the window frame 54 and the window pane is not in contact with the back face of the base portion, as shown in FIG. 7.

When the window pane 50 rises in the window frame 54 having this glass run channel 70, the peripheral edge 50*a* of the window pane 50 makes contact with the back face of the base portion 12, and presses the base portion 12 toward the frame base portion 61 of the window frame 54 (see FIG. 8). Accordingly, the base portion 12 is elastically deformed toward the frame base portion 61, whereby the thin plate-like portions 71*a*, 71*b* are pressed as a cushioning material against the frame base portion, and then the central part of the non-slip portion 70 is pressed against the frame base portion 61. Due to the elastic deformation, energy of the window pane 50 is absorbed to effectively reduce a sound when the window pane 50 bumps against the frame base portion 61.

When the window pane 50 is slightly slid to the rear (to the right in FIG. 1) of the vehicle body near the uppermost position (closed position), the non-slip portions 73, 74, 75 and the non-slip portion 71 are pressed against the window frame 54 even before the window pane 50 makes contact with the base portion 12. Therefore, the load on the non-slip portions is increased, and the frictional force is increased, whereby the dislocation of the glass run channel 70 from the window frame 54 is excellently restricted. In particular, the non-slip portions 74, 75 of the cover lips 24, 25 restrict the side wall portions 15, 16 from being moved due to a force along the longitudinal direction of the window frame 54 to be applied on the contacting lips 18, 19, and restrict the dislocation of the glass run channel 70 in longitudinal direction excellently.

Fourth Embodiment

Figure 9:
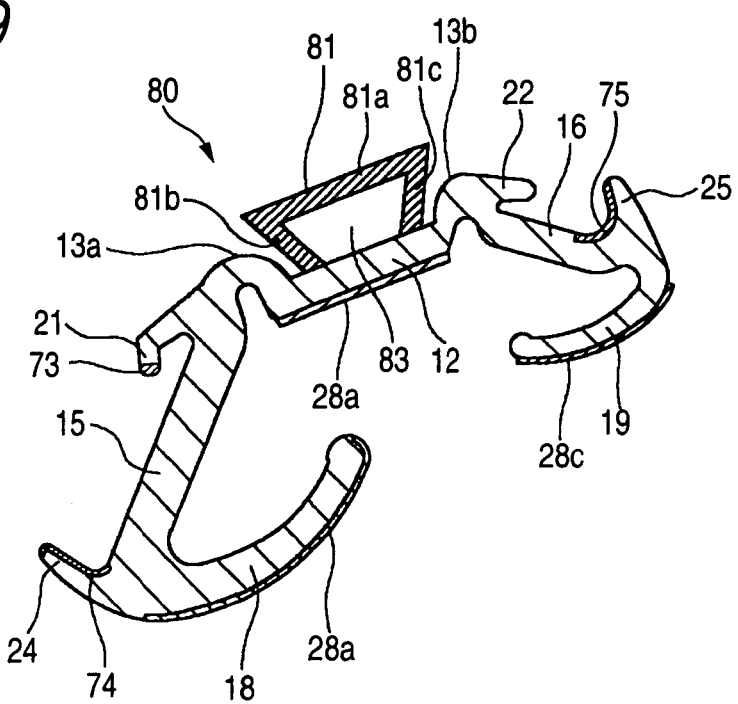
FIG. 9 is a cross-sectional view showing a free state of a glass run channel for a vehicle according to a fourth embodiment of the present invention.

In a fourth embodiment, a non-slip portion 81 is provided, instead of the non-slip portion 30 of the glass run channel 10 in the first embodiment. The non-slip portion 81 is made of a thermoplastic elastomer, and formed in a shape having a hollow portion 83 with a face of the base portion 12 opposed to the window frame 54. The non-slip portion 81 of the fourth embodiment includes one pair of side sections 81*b*, 81*c* protruding from the base portion 12 and a bottom section 81*a* substantially parallel to the base portion 12 and continuous with the protrusions of the side sections 81*b*, 81*c*. The hollow portion 83 may have a trapezoidal cross section, as shown in FIG. 9. With this constitution, since the non-slip portion 81 is given compressibility by the hollow portion 83, the material strength of the non-slip portion 81 is kept, whereby the same action or effect as the foam rubber is achieved. That is, the frictional force is increased remarkably because the non-slip portion is pressed against the window frame 54, thereby suppressing the dislocation of the glass run channel 80. Also, a sound produced in closing the window pane 50 is reduced efficiently due to elastic deformation of the hollow portion 83 between the window frame 54 and the window pane 50, as previously described.

The non-slip portion 81 of this embodiment is preferably integrally molded by co-extrusion with the base portion 12, but may be attached to the glass run channel later.

A shape that, when coupled with the base portion 12, forms a hollow portion is suitably applied in thermoplastic elastomer, or in materials having a small degree of deformation due to compression such as solid rubber. Also, the shape of the non-slip portion having the hollow portion 83 may have various shapes such as trapezoid, ellipse, rectangle, and non-bilateral shape, and the shape of the hollow portion 83 and the outer shape of the non-slip portion 81 may not be the same.

The present invention is not limited to the above embodiments.

The shape of the non-slip portion may be any of various shapes, and a plurality of non-slip portions may be provided, or made of different materials. For example, the thin plate-like portion protruding from both ends of the base portion 12 in the width direction to the window frame 54 may be provided only at one end or on one side of the non-slip portion in the third embodiment, or the thin plate-like portion may not protrude and may be pasted onto the longitudinal projection. Also, the position of the non-slip portion 30 is not limited to the position as described above, but the non-slip portion may be disposed to fill a space between the projection and the frame base portion of the window frame without hampering the inserting operation. Also, the non-slip portion need not be continuous and long, but may instead be provided intermittently on the base portion.

The non-slip portion is not limited to a layer attached on the face pressed against the window frame, but may be given in various forms in a range where the glass run channel can hold a predetermined strength. For example, the projection and the contacting lip may be totally molded of the thermoplastic elastomer making up the non-slip portion. Also, the non-slip portion need not be formed on a smooth surface, but may be formed convexly on the contact face of the cover lip or the side wall portion with the window frame. Though the non-slip portion is preferably integrally molded by co-extrusion with the glass run channel in the third embodiment, the non-slip portion may instead be separately molded and pasted onto the glass run channel by an adhesive later.

Also, the injection molded corner member of the glass run channel assembly may be provided with the non-slip portion or member in various forms.

Also, the window on which the glass run channel assembly and the glass run channel are mounted may be provided in any portion of the vehicle, including a front or rear closing door and any other portions of the vehicle. That is, though the glass run channel for vehicle for the front door is involved in the embodiment, the present invention may be also applicable to a glass run channel for rear door, for example. In this case, the upper portion and the slanting portion of the glass run channel may be formed of a continuous integral molding, and attached in a predetermined bent shape to the window frame, or a plurality of glass run channels having the same cross-sectional shape may be joined together at a certain angle at each end portion.

EXAMPLE 1

A resistance of the glass run channel according to the present invention was measured.

A specimen having the shape of the glass run channel 70 as shown in FIG. 7 was fabricated by co-extrusion. For the base portion 12 and the side wall portions 15, 16, an olefin thermoplastic elastomer having a coefficient of static friction of 1.35 measured by the above method was employed, and the non-slip portion 71 and the non-slip portions 73, 74 and 75 were made of the same material as described below.

Example I: an olefin thermoplastic elastomer having a coefficient of static friction of 1.89, and durometer HDA hardness of 38

Example II: an olefin thermoplastic elastomer having a coefficient of static friction of 1.85, and durometer HDA hardness of 50

Comparative Example I: an olefin thermoplastic elastomer having a coefficient of static friction of 1.35, and durometer HDA hardness of 75

Figure 10:
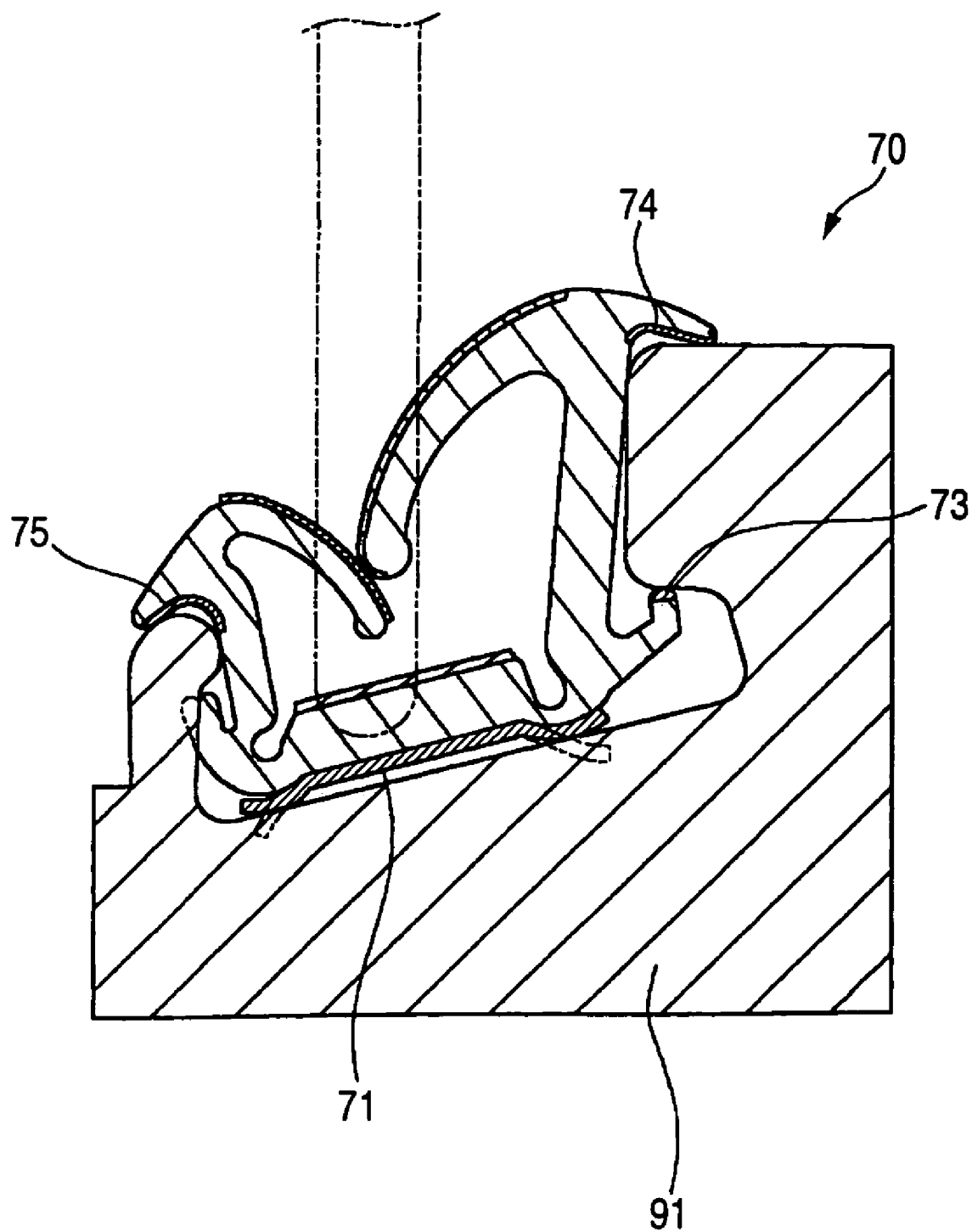
FIG. 10 is a cross-sectional view showing a jig used for measuring a resistance in an Example 1, and a state where the glass run channel is mounted on the jig.

Each specimen was attached on a sash 91, which is a fixture having the same inner configuration as a sash on which the glass run channel is mounted, having a cross sectional shape as shown in FIG. 10, and a glass pane having a thickness of 3.0 mm was inserted between the contacting lips, whereby the resistance of each specimen (70) against the sash 91 was measured. The measuring method is as follows.

1. A specimen having a length of 100 mm was set in a center of a sash having a length 300 mm, and a glass pane having a length of 200 mm and a thickness of 3.0 mm was inserted into the specimen.

2. Loads of 0N, 10N, 20N, 30N, 40N and 50N were applied via the glass pane to the specimen, and the specimen was corded and pulled along the longitudinal direction of the sash at a speed of 10 mm/sec, whereby the maximum load of the specimen when the specimen starts moving relative to the sash was measured. The measurement was repeated five times for each load and an average value (A) was obtained.

3. A specimen having a length of 300 mm was set on a sash having a length of 300 mm. A glass pane having a length of 100 mm and a thickness of 3.0 mm was inserted into the specimen.

4. Loads of 0N (no load), 10N, 20N, 30N, 40N and 50N were applied via the glass pane to the specimen, and the glass pane was slid for 100 mm along the longitudinal direction of the sash at a speed of 150 nm/sec, and a slide resistance was measured. The maximum value and the minimum value of the slide resistance were picked up when the glass pane was moved from 10 mm to 90 mm, and the average value (B) was obtained.

5. The average value (A) is a force corresponding to a biting force of the specimen against the sash and the slide resistance of the specimen against the glass pane, and the average value (B) is the slide resistance of the specimen against the glass pane, whereby the resistance (F) of the specimen against the sash was obtained in accordance with the following formula.

$$F(N/100\ mm) = A(N/100\ mm) - B(N/100\ mm)$$

The resistance against the sash in the Examples I, II and the Comparative Example I are listed in table 1.

TABLE 1

| | Setup Load (N) | | | | | |
|---|---|---|---|---|---|---|
| Specimen | 0 | 10 | 20 | 30 | 40 | 50 |
| Example I | 38 | 56 | 69 | 90 | 100 | 113 |
| Example II | 32 | 39 | 43 | 58 | 73 | 85 |
| Comparative Example I | 29 | 30 | 32 | 39 | 45 | 57 |

As a result, the Examples I, II and the Comparative Example I are compared, and it has been found that the specimen having the non-slip portion made of a material having a larger coefficient of static friction has a greater resistance. Accordingly, it has become clear that a glass run channel having a full dislocation suppression function can be obtained by providing a non-slip portion having a coefficient of static friction of 1.8 or more. Particularly, in the Example I in which the non-slip portion and the non-slip portion had lower hardness, the resistance indicated a larger value.

EXAMPLE 2

The degree of dislocation was measured when the glass run channel according to the present invention was mounted on the actual vehicle.

An extruded member having the same cross-sectional shape and made of the same material as in the Example I and the Comparative Example I was joined with the injection molded corner members 8, 9, as shown in FIG. 1, whereby glass run channel assemblies for a vehicle door were fabricated as Example III and Comparative Example II. Each glass run channel assembly was attached in the window frame of a vehicle door by an ordinary method.

Figure 11:
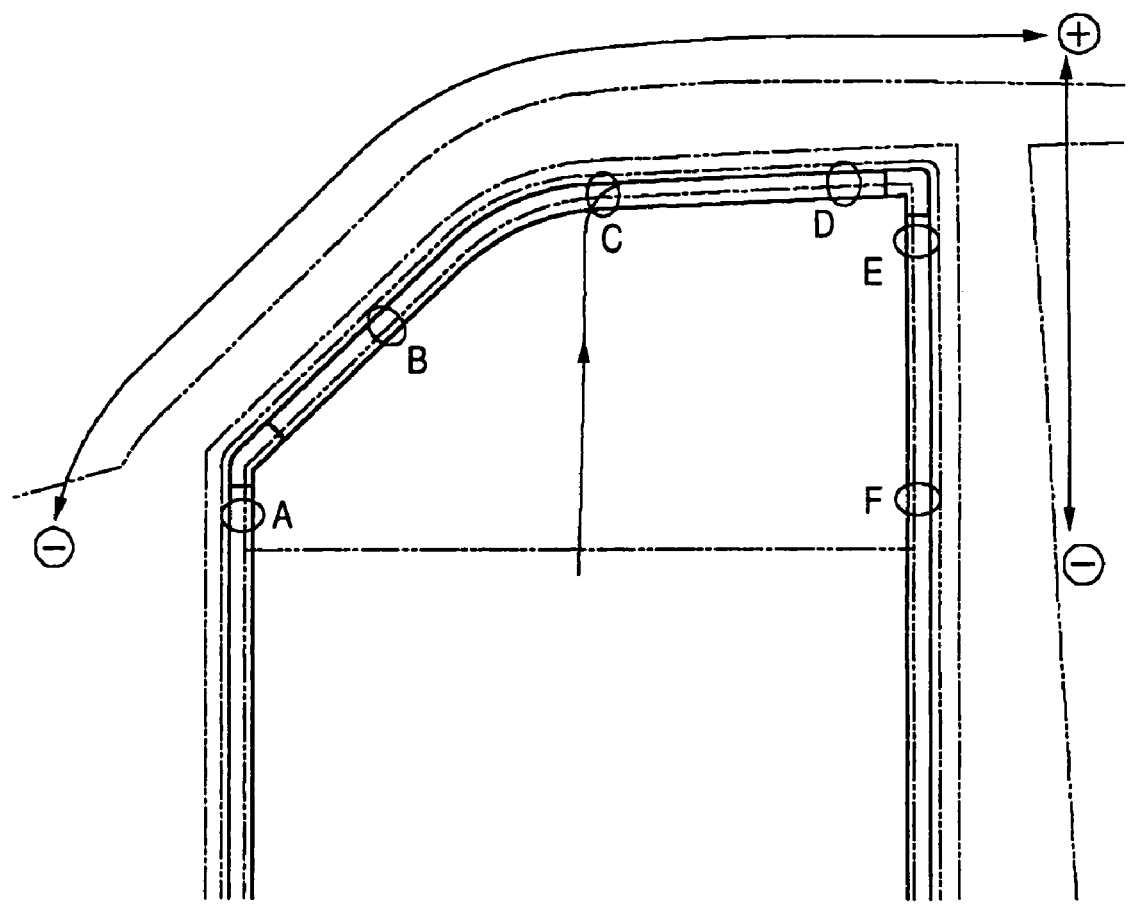
FIG. 11 is an explanatory view showing a measuring part and a displacement direction of the glass run channel assembly in an Example 2.

Under conditions of temperature of 80° and humidity of 95%, an operation in which the glass window pane was shut for 30 minutes and opened for 30 seconds as one cycle was repeated 300 times by lifting the glass window pane. Thereafter, the amount of displacement of the portion A to F of the glass run channel assembly as shown in FIG. 11 from the position before lifting the glass window pane was measured. The results are listed in Table 2. The amount of displacement was defined as plus (+) when the glass run channel assembly was displaced up or right, and minus (−) when it was displaced down or left, as shown in FIG. 11.

TABLE 2

| | | | Portion | | | (unit: mm) |
|---|---|---|---|---|---|---|
| Specimen | A | B | C | D | E | F |
| Example III | ±0 | ±0 | +0.2 | +0.5 | −0.1 | −0.4 |
| Comparative Example II | +8.0 | +7.2 | +5.8 | +2.0 | −1.0 | −3.2 |

As is apparent from the result, the amount of displacement was below 1 mm in any portion in the Example III, while the amount of displacement was 1 mm or more in any portion, and at most 8 mm, in the Comparative Example II. It has been found that a dislocation suppression function can act effectively irrespective of the resistance repeatedly exerted, and the proper position is maintained under the actual service conditions in the Example III.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated.

For example, even though the term "glass run channel" has been used, it is clear that the invention is applicable even with windows or other panels that are made of material other than glass, and the term "glass run channel," as defined by Applicants, covers such situations in which glass is not actually used.

What is claimed is:

1. A glass run channel for a vehicle, the glass run channel being mountable, in an attached state, along a window frame of the vehicle for guiding a slidable window pane, the glass run channel being made of a thermoplastic elastomer having a first coefficient of friction with respect to the window frame, the glass run channel comprising:
   a base portion made of the thermoplastic elastomer having the first coefficient of friction, the base portion opposing a bottom face of the window frame when the glass run channel is mounted on the window frame;
   a pair of side wall portions made of the thermoplastic elastomer having the first coefficient of friction, the side wall portions extending from the base portion, the side wall portions each including a contact point that contacts the window frame in an attaching operation, the contact points being exposed such that the thermoplastic elastomer having the first coefficient of friction can contact the window frame in the attaching operation;
   at least one cover lip protruding from a corresponding one of the side wall portions, the cover lip covering a gap between the window frame and the glass run channel;
   at least one elastically deformable contacting lip protruding from a distal end, or from near a distal end, of a respective one of the side wall portions toward the base portion;
   a plurality of projections, projecting outwards at least from respective ends of the base portion or from the respective side wall portions, which engage inner faces of the window frame when the glass run channel is mounted, the plurality of projections being made of the thermoplastic elastomer having the first coefficient of friction; and
   a first non-slip portion made of a material having a second coefficient of friction with respect to the window frame, the second coefficient of friction being larger than the first coefficient of friction,
   wherein the first non-slip portion is integral with the base portion, and is pressed against the bottom face of the window frame due to a force applied by the plurality of projections when the glass run channel is mounted on the window frame.

2. The glass run channel according to claim 1, wherein the first non-slip portion is made of rubber.

3. The glass run channel according to claim 2, wherein the first non-slip portion is made of foam rubber and pressed in an elastically compressed state between the bottom face of the window frame and the base portion.

4. The glass run channel according to claim 1, wherein the first non-slip portion is made of a thermoplastic elastomer.

5. The glass run channel according to claim 4, wherein the first non-slip portion is made of an olefin thermoplastic elastomer having durometer hardness from HDA30 to HDA60 in accordance with JIS K7215.

6. The glass run channel according to claim 1, wherein the first non-slip portion is welded or fused with the base portion.

7. The glass run channel according to claim 1, wherein the first non-slip portion is formed as a flat plate, and a whole face of the first non-slip portion contacts the bottom face of the window frame.

8. The glass run channel according to claim 1, wherein the thermoplastic elastomer making up the base portion is an olefin thermoplastic elastomer.

9. The glass run channel according to claim 1, further comprising a sliding portion provided in a layer on a face of the base portion which contacts with a peripheral edge of the window pane, wherein the sliding portion is made of a material having a smaller coefficient of friction with respect to the window pane than that of a constituent material of the base portion.

10. The glass run channel according to claim 1, further comprising a sliding portion provided in a layer on a face of the at least one contacting lip which elastically contacts the window pane, wherein the sliding portion is made of a material having a smaller coefficient of friction with respect to the window pane than that of a constituent material of the contacting lip.

11. The glass run channel according to claim 1, further comprising longitudinal projections projecting outwards from the ends of the base portion in the width direction, wherein
 a space is formed between the base portion, the bottom face of the window frame and the longitudinal projections when the glass run channel is mounted on the window frame, and
 the first non-slip portion is disposed in a compressed state between the base portion and the bottom face of the window frame within the space while the longitudinal projections directly contact the bottom face of the window frame.

12. The glass run channel according to claim 11, wherein the first non-slip portion protrudes by extending outwards in the width direction beyond the longitudinal projections so as to at least partially cover the longitudinal projections.

13. The glass run channel according to claim 12, wherein
 the first non-slip portion does not contact with the longitudinal projections before the glass run channel is mounted on the window frame,
 the non-slip portion makes contact with the longitudinal projections by being pressed against the bottom face of the window frame while a central part of the non-slip portion corresponding to the base portion is kept away from the bottom face of the window frame, or slightly contacts the bottom face of the window frame, when the glass run channel is mounted on the window frame, and
 the center part of the non-slip portion is pressed against the bottom face of the window frame when the window pane presses the base portion toward the window frame.

14. The glass run channel according to claim 1, further comprising
 a second non-slip portion provided on a face of at least the cover lip or the projections which oppose the window frame, wherein
 the second non-slip portion is made of a material having a larger coefficient of friction than that of the thermoplastic elastomer making up at least the cover lip or the projections, and is pressed against the window frame when the glass run channel is mounted on the window frame.

15. The glass run channel according to claim 1, wherein a hollow space is defined between the base portion and the first non-slip portion.

16. The glass run channel according to claim 1, wherein the first non-slip portion includes portions that have the second coefficient of friction and that (i) in a state prior to attachment of the glass run channel to the window frame, protrude away from a part of the base portion that has the first coefficient of friction, and (ii) in a state of attachment to the window frame, contact the part of the base portion that has the first coefficient of friction.

17. The glass run channel according to claim 1, further comprising a second non-slip portion, having a coefficient of friction larger than the first coefficient of friction, on an outer tip of the at least one cover lip.

18. The glass run channel according to claim 1, further comprising a second non-slip portion, having a coefficient of friction larger than the first coefficient of friction, on a portion of at least one of the projections, the second non-slip portion being physically separate from the first non-slip portion.

19. The glass run channel according to claim 1, further comprising a second non-slip portion, having a coefficient of friction larger than the first coefficient of friction, on the base portion, the first and second non-slip portions differing from each other in material type and/or thickness.

20. A glass run channel assembly for a vehicle, the glass run channel being mountable, in an attached state, along a window frame of the vehicle for guiding a slidable window pane, the glass run channel assembly being made of a thermoplastic elastomer having a first coefficient of friction with resoect to the window frame, the glass run channel assembly comprising:
 a plurality of linear extruded members; and
 at least one injection molded corner member having a shape in which terminals of the extruded members in a longitudinal direction are intersected at a certain angle and joined,
 wherein the extruded members and the injection molded corner member comprise:
 a base portion made of the thermoplastic elastomer having the first coefficient of friction, the base portion opposing a bottom face of the window frame when the glass run channel assembly is mounted on the window frame,
 a pair of side wall portions made of the thermoplastic elastomer having the first coefficient of friction, the side wall portions extending from the base portion, the side wall portions each including a contact point that contacts the window frame in an attaching operation, the contact points being exposed such that the thermoplastic elastomer having the first coefficient of friction can contact the window frame in the attaching operation;
 at least one cover lip protruding from a corresponding one of the side wall portions, the cover lip covering a gap between the window frame and the glass run channel;
 at least one elastically deformable contacting lip protruding from a distal end, or from near a distal end, of a respective one of the side wall portions toward the base portion, and
 a plurality of projections, projecting outwards at least from respective ends of the base portion or from the respective side wall portions, which engage inner faces of the window frame when the glass run channel assembly is mounted on the window frame, the plurality of projections being made of the thermoplastic elastomer having the first coefficient of friction,
 wherein at least one base portion of the extruded members has a non-slip portion made of a material having a second coefficient of friction with respect to the window frame, the second coefficient of friction being larger than the first coefficient of friction, and
 the non-slip portion is integral with the base portion, and is pressed against the bottom face of the window frame due to a force applied by projections when the glass run channel is mounted on the window frame.

21. The glass run channel assembly according to claim 20, wherein the non-slip portion is included on a base portion of the extruded member mounted in a portion of the window frame against which the distal end of the window pane abuts.

* * * * *